United States Patent
Jin et al.

(10) Patent No.: US 12,489,939 B2
(45) Date of Patent: Dec. 2, 2025

(54) PROGRESS CONTENT VIEW PROCESSING METHOD, APPARATUS, AND SYSTEM

(71) Applicant: SHANGHAI BILIBILI TECHNOLOGY CO., LTD., Shanghai (CN)

(72) Inventors: Zijian Jin, Shanghai (CN); Ran Tang, Shanghai (CN); Jie Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 108 days.

(21) Appl. No.: 18/514,884

(22) Filed: Nov. 20, 2023

(65) Prior Publication Data

US 2024/0171809 A1    May 23, 2024

(30) Foreign Application Priority Data

Nov. 22, 2022   (CN) ......................... 202211463885.X

(51) Int. Cl.
 *H04N 21/431* (2011.01)
 *H04N 21/2187* (2011.01)
 *H04N 21/472* (2011.01)

(52) U.S. Cl.
 CPC ..... *H04N 21/4312* (2013.01); *H04N 21/2187* (2013.01); *H04N 21/47217* (2013.01)

(58) Field of Classification Search
 CPC .......... H04N 21/4312; H04N 21/2187; H04N 21/47217; H04N 21/8549; H04N 21/44012; H04N 21/431; H04N 21/44016
 See application file for complete search history.

(56) References Cited

U.S. PATENT DOCUMENTS

| | | | |
|---|---|---|---|
| 2020/0186852 A1* | 6/2020 | Ramamurthy | ... H04N 21/47202 |
| 2020/0322647 A1* | 10/2020 | Zheng | ... H04N 21/8549 |
| 2020/0404383 A1* | 12/2020 | Li | ... H04N 21/8455 |

FOREIGN PATENT DOCUMENTS

| | | |
|---|---|---|
| CN | 101631092 A | 1/2010 |
| CN | 107820115 A | 3/2018 |
| CN | 110198452 A | 9/2019 |
| KR | 2020-0116887 A | 10/2020 |

OTHER PUBLICATIONS

China Patent Application No. 202211463885.X; Office Action; dated Apr. 22, 2025; 22 pages.

* cited by examiner

*Primary Examiner* — Alazar Tilahun
(74) *Attorney, Agent, or Firm* — BakerHostetler

(57) ABSTRACT

This disclosure describes techniques for processing data. The techniques comprise obtaining live video data; generating content view images based on the live video data; generating a spliced image corresponding to the live video data based on splicing the content view images; generating image-time mapping data corresponding to the spliced image by recording mapping relationships between the content view images and video time points, wherein the spliced image and the image-time mapping data enable to display a content view image corresponding to a historical video time point at a location close to a progress element on a page of playing the live video data; and sending, to the client device, the live video data, the spliced image corresponding to the live video data, and the image-time mapping data corresponding to the spliced image during a process of pulling the live video data by the client device.

20 Claims, 4 Drawing Sheets

PROGRESS CONTENT VIEW PROCESSING METHOD, APPARATUS, AND SYSTEM

CROSS-REFERENCE TO RELATED APPLICATION

The present application claims priority to Chinese Patent Application No. 202211463885.X, filed on Nov. 22, 2022, which is incorporated herein by reference in its entirety.

TECHNICAL FIELD

Embodiments of the present application relate to the field of Internet technologies, and in particular, to a progress content preview processing method, apparatus, and system.

BACKGROUND ART

With the development of computer technologies, live streaming and other services have become popular network services at present. In network livestreaming, an online streamer can provide an audience with multimedia content by using a live platform. Improvements in livestreaming are desired.

SUMMARY OF THE INVENTION

In view of the above problem, the present application proposes a progress content preview processing method, apparatus, and system, a computing device, and a computer storage medium, to solve the following problem: In existing live time shifting, a specific position can be located only by a time of a progress bar, and specific time-shifted picture content cannot be displayed. As a result, a user cannot quickly locate content that the user wants to watch.

According to an aspect of the embodiments of the present application, a progress content preview processing method is provided, including:
  obtaining live video data, generating content preview images based on the live video data, and splicing the content preview images to obtain a spliced image corresponding to the live video data;
  recording mapping relationships between the content preview images and video time points to form image-time mapping data corresponding to the spliced image; and
  sending, to a client, the spliced image corresponding to the live video data and the image-time mapping data corresponding to the spliced image during a process of the client pulling the live video data, so that the client parses, in response to a progress preview request of a user for a historical video time point of the live video data, the spliced image corresponding to the live video data and the image-time mapping data corresponding to the spliced image, and determines and displays a content preview image corresponding to the historical video time point.

Further, the generating content preview images based on the live video data further includes:
  performing key frame extraction on the live video data to obtain key frames; and
  generating the content preview images by using the key frames.

Further, the live video data includes: an intra picture, a predictive-frame, and a bi-directional interpolated prediction frame; and the performing key frame extraction on the live video data to obtain key frames further includes:
  detecting whether a current frame in the live video data is an intra picture; and
  if the current frame is the intra picture, extracting the current frame from the live video data, and determining the current frame as the key frame.

Further, the generating the content preview images by using the key frames further includes:
  for each of the key frames, performing resolution compression processing on a frame image of the key frame to compress a resolution of the frame image to a preset resolution to obtain a content preview image corresponding to the key frame.

Further, the method further includes:
  writing the image-time mapping data corresponding to the spliced image and the preset resolution into a description file.

Further, the splicing the content preview images to obtain a spliced image corresponding to the live video data further includes:
  adding the content preview images to a preset image container according to a generation sequence of the content preview images, and setting position information of the content preview images in the preset image container, to obtain the spliced image corresponding to the live video data.

Further, the recording mapping relationships between the content preview images and video time points to form image-time mapping data corresponding to the spliced image further includes:
  obtaining video time points of the key frames in the live video data, and recording mapping relationships between image identifiers of content preview images corresponding to the key frames and the video time points of the key frames in the live video data to form the image-time mapping data corresponding to the spliced image.

Further, the sending, to a client, the spliced image corresponding to the live video data and the image-time mapping data corresponding to the spliced image during a process of the client pulling the live video data further includes:
  determining, in response to a current live play request for a live broadcast room that is sent by the client, a request time point corresponding to the current live play request; and
  sending, in real time and to the client, live video data of the live broadcast room that is obtained after the request time point, a spliced image corresponding to the live video data that is generated after the request time point, and image-time mapping data corresponding to the spliced image.

According to another aspect of the embodiments of the present application, a
  progress content preview processing method is provided, including:
  pulling, from a server, i.e., a server computing system, and storing live video data, a spliced image corresponding to the live video data, and image-time mapping data corresponding to the spliced image;
  displaying the live video data;
  parsing, in response to a progress preview request of a user for a historical video time point of the live video data, the spliced image corresponding to the live video data and the image-time mapping data corresponding to the spliced image, and determining a content preview image corresponding to the historical video time point; and displaying the content preview image corresponding to the historical video time point.

Further, the pulling, from a server, and storing live video data, a spliced image corresponding to the live video data, and image-time mapping data corresponding to the spliced image further includes:

sending a current live play request for a live broadcast room to the server in response to an operation of the user entering the live broadcast room, so that the server determines, in response to the current live play request, a request time point corresponding to the current live play request; and receiving and storing live video data of the live broadcast room that is obtained after the request time point and sent by the server, a spliced image corresponding to the live video data that is generated after the request time point, and image-time mapping data corresponding to the spliced image.

Further, the parsing the spliced image corresponding to the live video data and the image-time mapping data corresponding to the spliced image, and determining a content preview image corresponding to the historical video time point further includes:

searching the image-time mapping data corresponding to the spliced image for an image identifier that has a mapping relationship with the historical video time point; and extracting a content preview image corresponding to the image identifier from the spliced image corresponding to the live video data, and determining the content preview image as the content preview image corresponding to the historical video time point.

Further, before the parsing the spliced image corresponding to the live video data and the image-time mapping data corresponding to the spliced image, and determining a content preview image corresponding to the historical video time point, the method further includes:

determining whether the historical video time point is before the request time point corresponding to the current live play request; and if the historical video time point is before the request time point corresponding to the current live play request, pulling, from another client device in a same client domain or the server, a spliced image corresponding to the live video data and image-time mapping data corresponding to the spliced image.

Further, the pulling, from another client in a same client domain or the server, a spliced image corresponding to the live video data and image-time mapping data corresponding to the spliced image further includes:

requesting, in a point-to-point communication manner and from the another client in the same client domain, a spliced image including the content preview image corresponding to the historical video time point and image-time mapping data corresponding to the spliced image; and if the another client in the same client domain includes no spliced image including the content preview image corresponding to the historical video time point or image-time mapping data corresponding to the spliced image, requesting, from the server, a spliced image including the content preview image corresponding to the historical video time point and image-time mapping data corresponding to the spliced image.

Further, the same client domain is an organizational unit including clients served by a same edge serving node.

Further, the displaying the content preview image corresponding to the historical video time point further includes:

displaying, at a preset position of a progress display element in a display page of the live broadcast room, the content preview image corresponding to the historical video time point.

According to still another aspect of the embodiments of the present application, a progress content preview processing apparatus is provided, including:

a splicing module configured to obtain live video data, generate content preview images based on the live video data, and splice the content preview images to obtain a spliced image corresponding to the live video data;

a mapping module configured to record mapping relationships between the content preview images and video time points to form image-time mapping data corresponding to the spliced image; and a processing module configured to send, to a client, i.e., a client computing device, the spliced image corresponding to the live video data and the image-time mapping data corresponding to the spliced image during a process of the client pulling the live video data, so that the client parses, in response to a progress preview request of a user for a historical video time point of the live video data, the spliced image corresponding to the live video data and the image-time mapping data corresponding to the spliced image, and determines and displays a content preview image corresponding to the historical video time point.

According to yet another aspect of the embodiments of the present application, a progress content preview processing apparatus is provided, including:

a pull module configured to pull, from a server, and store live video data, a spliced image corresponding to the live video data, and image-time mapping data corresponding to the spliced image;

a live video display module configured to display the live video data;

a parsing module configured to parse, in response to a progress preview request of a user for a historical video time point of the live video data, the spliced image corresponding to the live video data and the image-time mapping data corresponding to the spliced image, and determine a content preview image corresponding to the historical video time point; and a preview module configured to display the content preview image corresponding to the historical video time point.

According to another aspect of the embodiments of the present application, a progress content preview processing system is provided, including: a progress content preview processing apparatuses as described above.

According to still another aspect of the embodiments of the present application, a computing device is provided, including: a processor, a memory, a communications interface, and a communications bus, where the processor, the memory, and the communications interface complete communication with each other via the communications bus; and the memory is configured to store at least one executable instruction, and the executable instruction causes the processor to perform operations corresponding to a progress content preview processing method as described above.

According to yet another aspect of the embodiments of the present application, a computer storage medium having stored therein at least one executable instruction is provided, where the executable instruction causes a processor to perform operations corresponding to a progress content preview processing method as described above.

According to the progress content preview processing method, apparatus, and system provided in the embodiments of the present application, the live video data is obtained, the content preview images are generated based on the live video data, and the content preview images are spliced to obtain the spliced image corresponding to the live video data; the mapping relationships between the content preview images and the video time points are recorded to form the image-time mapping data corresponding to the spliced image; and the spliced image corresponding to the live video data and the image-time mapping data corresponding to the spliced image are sent to the client, i.e., client computing device, during a process of the client pulling the live video data. In this solution, during an HLS-based slice production process, the content preview images are produced in real time, and the plurality of content preview images are spliced together in the form of the spliced image, namely, a sprite. The spliced image corresponding to the live video data and the image-time mapping data corresponding to the spliced image are provided to the client together, so that the client parses, in response to the progress preview request of the user for the historical video time point of the live video data, the spliced image corresponding to the live video data and the image-time mapping data corresponding to the spliced image, and determines and displays the content preview image corresponding to the historical video time point, to provide the user with a live time-shifted content preview image. Therefore, the user can watch content preview images at different historical video time points of the live video data, and quickly know picture content during live time shifting, so as to quickly locate an actually desired time-shifted position.

The above description is merely an overview of the technical solutions of the embodiments of the present application. To understand the technical means of the embodiments of the present application more clearly so that the technical means of the embodiments of the present application can be implemented according to the content of the description, and to make the above and other objectives, features, and advantages of the embodiments of the present application clearer and easier to understand, specific implementations of the embodiments of the present application are provided below.

BRIEF DESCRIPTION OF THE DRAWINGS

Various other advantages and benefits become apparent to a person of ordinary skill in the art from reading of the following detailed description of preferred implementations. The accompanying drawings are merely used for a purpose of illustrating the preferred implementations, and are not considered as limitations on the embodiments of the present application. In addition, throughout the accompanying drawings, the same components are represented by the same reference numerals. In the figures.

DETAILED DESCRIPTION OF EMBODIMENTS

Figure 1:
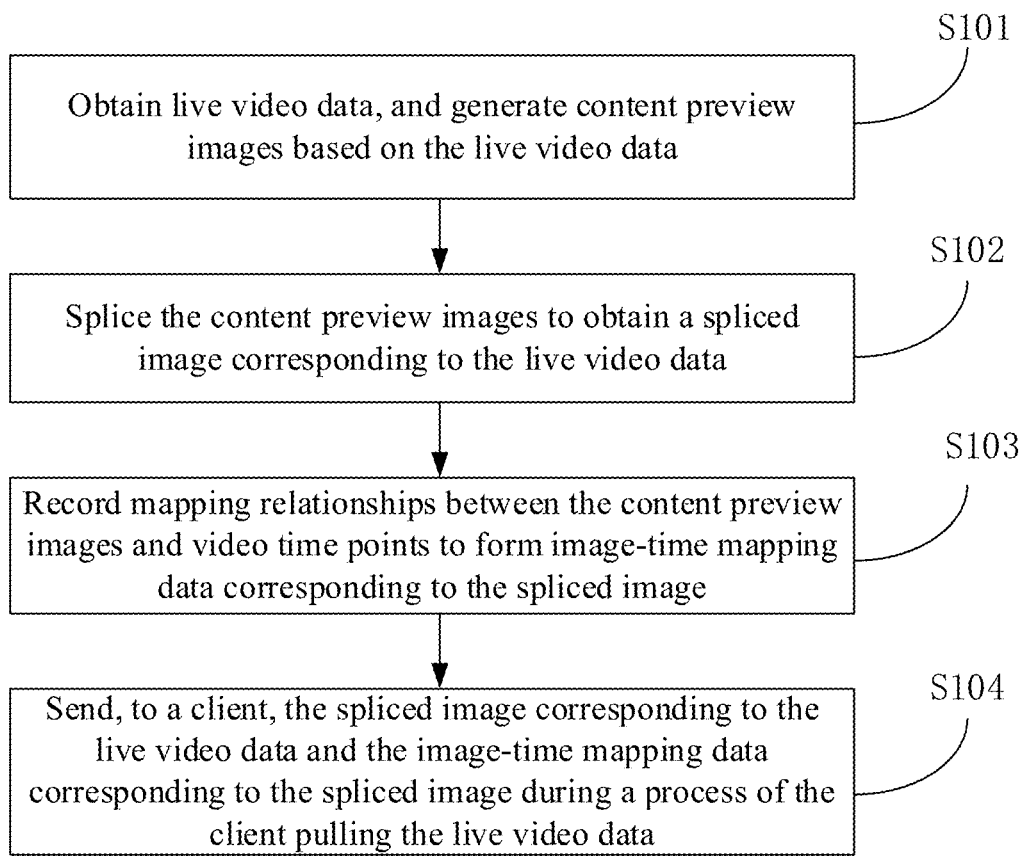
FIG. 1 is a schematic flowchart of a progress content preview processing method according to an embodiment of the present application.

Exemplary embodiments of the present disclosure are described in more detail below with reference to the accompanying drawings. Although the exemplary embodiments of the present disclosure are shown in the accompanying drawings, it should be understood that the present disclosure may be implemented in various forms and should not be limited to the embodiments described herein. Instead, these embodiments are provided to enable a more thorough understanding of the present disclosure and convey the scope of the present disclosure to a person skilled in the art fully.

First, the terms used in one or more embodiments of the present application are explained.

Live broadcast: Generally, live broadcast is a live broadcast of a network video, also including a live broadcast of a television station in a broad sense. Live audio/a live video is pushed to a server in the form of a media stream (stream pushing). If an audience watches a live broadcast, a server transmits a video to a website, an application (APP) of a client, a player of a client device, etc. upon receiving a request from a user, so as to play the video in real time.

Video on demand: Video on demand, as a video on demand system that plays a program as required by an audience, transmits video content clicked on or selected by a user to the requested user.

HTTP-based adaptive bitrate streaming protocol (HTTP live streaming, HLS): HLS is a dynamic adaptive bitrate technology. It is used for real-time transmission of audio/video streams. At present, the HLS protocol is widely applied in the fields of video on demand and live broadcast. A working principle of the HLS protocol is dividing an overall stream into a sequence of small HTTP-based files for downloading, with only a few files downloaded each time. The files include an m3u8 index file.

m3u8 file: The m3u8 file is an index file. Usually, one audio/video file is divided into several small files, and then an address and a play sequence of each file are recorded by using m3u8.

Live time shifting: Live time shifting is a technology combined with live broadcast and video on demand, which allows any past live content to be watched during a live broadcast process. An audience can go back to a time point at a current time point and then start watching video content until the end of the video content.

Sprite: The sprite is also referred to as a sprite image or a spliced image. Many small pictures need to be loaded when each of many large webpages is loaded for the first time. Considering the problem that a server is congested at a same time, the sprite technology is used to alleviate a problem that user experience is affected due to an extremely long loading time. In computer graphics, when a two-dimensional image is integrated into a scene and becomes a part of an entire displayed image, this image is referred to as a sprite. In this embodiment, an image obtained by splicing content preview images is referred to as a spliced image.

JavaScript object notation (JSON): JSON is a lightweight data interchange format, the content of which consists of attributes and values. Therefore, it also has an advantage of being easy to read and process. JSON is a program-language-independent data format, which is not merely a subset of JavaScript, and also adopts idioms of a C language family. The widespread use of JSON has also turned it into a common data format.

Peer to peer (P2P) network: P2P network belongs to the scope of an overlay network, and is a network information interchange manner relative to a client/server (C/S) mode. In the C/S mode, data is distributed by using a special server, from which a plurality of client devices obtain data.

FIG. 1 is a schematic flowchart of a progress content preview processing method according to an embodiment of the present application. The method is applicable to a server, i.e., a server computing system. HLS protocol may be used for real-time transmission of audio/video streams. Based on an HLS protocol system, a live time shifting function can be provided. The live time shifting function allows a user who watches a live broadcast to go back to a historical time point at a current time point, and then start watching the live broadcast from this historical time point into the end. In live time shifting, a user usually locates, by a time of a progress bar, the content that the user wants to watch. But when the user clicks on the progress bar in the live time shifting, the user may not know and view specific time-shifted picture content clicked, and can locate a specific position only by the time of the progress bar. As a result, the user needs to perform multiple clicks to find the content that the user really wants to watch, which seriously affects the usage experience of the user for the live time shifting. The present disclosure provides improved techniques enabling display a content view image corresponding to a historical video time point at a location close to a progress element on a page of playing the live video data. As shown in FIG. 1, the method includes the following steps.

In step S101: live video data is obtained, and content view images are generated based on the live video data.

In this embodiment, during a process of transmitting the live video data by applying the HLS protocol, because a working principle of the HLS protocol is dividing an overall stream into a sequence of small slices (i.e. HTTP-based files) for downloading, it is possible to obtain the live video data by using the server and generate the content view images in real time based on the live video data during an HLS-based slice production process.

In an optional implementation, step S101 further includes: performing key frame extraction on the live video data to obtain key frames; and generating the content view images by using the key frames.

In this embodiment, the server obtains the live video data, and performs key frame extraction on the live video data to obtain the key frames; and the server generates the content view images by using the key frames.

In an optional implementation, the live video data includes: an intra picture, a predictive-frame, and a bi-directional interpolated prediction frame. Specifically, in video compression, each frame represents one still image. In actual video compression coding, various algorithms are used to reduce a data capacity. IPB frames are the most common algorithm. The IPB frames include: an intra picture (I-frame), a predictive-frame (P-frame), and a bi-directional interpolated prediction frame (B-frame). The I-frame is usually the first frame of each group of pictures (GOP). After being appropriately compressed, the I-frame is used as a random access reference point, and can be considered as a still image. The P-frame is usually a coded image obtained by fully removing temporal redundancy information of a previous coded frame in an image sequence to compress the amount of data transmission. The B-frame is usually a coded image for compressing the amount of data transmission, which is obtained by considering temporal redundancy information of both a previous coded frame in a source image sequence and a following coded frame in the source image sequence.

From a coding/decoding perspective, the I-frame itself can be decompressed into a separate complete video picture by using a video decompression algorithm. Therefore, the I frame is obtained by removing redundancy information of a video frame in a spatial dimension. The P-frame needs to be decoded into a complete video picture with reference to a previous I-frame or P-frame. The B-frame needs to be generated as a complete video picture with reference to a previous I-frame or P-frame and a P-frame following the B-frame. Therefore, the P-frame and the B-frame are each obtained by removing redundancy information of a video frame in a temporal dimension.

In an optional implementation, step S101 further includes: detecting whether a current frame in the live video data is an intra picture; and if the current frame is the intra picture, extracting the current frame from the live video data, and determining the current frame as the key frame.

Specifically, a coder encodes a plurality of images to generates chunks of GOPs, and a decoder reads the chunks of GOPs for decoding during playing, and then reads pictures for rendering and display. For the I-frame itself, it can be decompressed into a single complete video picture by using a video decompression algorithm, that is to say, the I-frame is a complete picture, and the P-frame and the B-frame record changes relative to the I-frame. If there is no I-frame, the P-frame and the B-frame cannot be decoded. Therefore, in this embodiment, the I frame is determined as the key frame.

In an optional implementation, step S101 further includes: for each of the key frames, performing resolution compression processing on a frame image of the key frame to compress a resolution of the frame image to a preset resolution to obtain a content view image corresponding to the key frame.

Specifically, a resolution affects an image size, and the resolution is directly proportional to the image size. That is, a higher resolution indicates a larger image, and a lower resolution indicates a smaller image. In this embodiment, to facilitate loading of the content view images, for each key frame, resolution compression processing needs to be performed on a frame image of the key frame. For example, a resolution may be preset to 24*24, and the preset resolution may be written into a description file. In this case, the resolution of the frame image may be compressed to 24*24 and the compressed image may be used as the content view image corresponding to the key frame.

In step S102: the content view images are spliced to obtain a spliced image corresponding to the live video data.

The content view images may be added to a preset image container according to a generation sequence of the content view images, and position information of the content view images in the preset image container may be set, to obtain the spliced image corresponding to the live video data.

In this embodiment, the preset image container may be a background canvas of a sprite technology. When a user wants to locates desired content by means of live time shifting by using a client device, it is possible to move a small picture in the background so that a part that the user wants to display is displayed, thereby relieving a processing pressure. A principle of a sprite is combining many small pictures into a relatively large picture, so that when a page is loaded for the first time, only the large picture into which the small pictures are combined, namely, the sprite, needs to be loaded. In this way, a page loading speed is reduced to some extent, and an image processing pressure is alleviated to some extent.

In step S103: mapping relationships between the content view images and video time points are recorded to form image-time mapping data corresponding to the spliced image.

Video time points of the key frames in the live video data are obtained, and mapping relationships between image identifiers of content view images corresponding to the key frames and the video time points of the key frames in the live video data are recorded to form the image-time mapping data corresponding to the spliced image.

In addition, the image-time mapping data corresponding to the spliced image and the preset resolution may be further written into a description file. The description file may be a description file in a JSON format. On the basis that the description file in the JSON format has an advantage of being easy to read and process, data such as the image-time mapping data corresponding to the spliced image and the preset resolution is written into the description file. The image-time mapping data corresponding to the spliced image is mapping data between the content view images in the spliced image and corresponding play times (i.e. times corresponding to a progress display element such as a progress bar) in the entire live video data.

Specifically, the mapping relationships between the image identifiers of the content view images corresponding to the key frames and the video time points of the key frames in the live video data may be recorded to form the image-time mapping data corresponding to the spliced image, and the image-time mapping data corresponding to the spliced image may be written into the description file (for example, a JSON file). When the client needs to pull live time-shifted content, the server may send the spliced image and the JSON file together to the client.

In step S104: the spliced image corresponding to the live video data and the image-time mapping data corresponding to the spliced image are sent to a client during a process of the client pulling the live video data.

In this step, during a process in which the user on a client watches a live broadcast, the server may send the live video data, the spliced image corresponding to the live video data, and the image-time mapping data corresponding to the spliced image to the client. If the user initiates a progress preview request for a historical video time point of the live video data on the client, the client may parse the spliced image corresponding to the live video data and the image-time mapping data corresponding to the spliced image, and determine and display a content view image corresponding to the historical video time point. The progress preview request may be an operation performed by the user on a progress display element of a live video, or the like.

In an optional implementation, step S104 further includes: determining, in response to a current live play request for a live broadcast room that is sent by the client, a request time point corresponding to the current live play request; and sending, in real time and to the client, live video data of the live broadcast room that is obtained after the request time point, a spliced image corresponding to the live video data that is generated after the request time point, and image-time mapping data corresponding to the spliced image.

If the user enters the live broadcast room relatively early, that is, before the live broadcast starts, after the live broadcast starts, the client obtains live video data starting from a live broadcast start time point, a spliced image corresponding to the live video data, and image-time mapping data corresponding to the spliced image. If the live broadcast has started when the user enters the live broadcast room, previously generated live video data, a previously generated spliced image, and previously generated image-time mapping data may not need to be delivered to the client, thereby reducing the amount of data transmission and alleviating the pressure of the server. The server needs to send, in real time and to the client, only the live video data of the live broadcast room that is obtained after the request time point, the spliced image corresponding to the live video data that is generated after the request time point, and the image-time mapping data corresponding to the spliced image.

According to the progress content preview processing method provided in this embodiment of the present application, during an HLS-based slice production process, the content view images can be produced in real time, and the plurality of content view images can be spliced together in the form of the spliced image, namely, a sprite. The spliced image corresponding to the live video data and the image-time mapping data corresponding to the spliced image are provided to the client together, so that the client parses, in response to the progress preview request of the user for the historical video time point of the live video data, the spliced image corresponding to the live video data and the image-time mapping data corresponding to the spliced image, and determines and displays the content view image corresponding to the historical video time point, to provide the user with a live time-shifted content view image. Therefore, the user can watch content view images at different historical video time points of the live video data, and quickly know picture content during live time shifting, so as to quickly locate an actually desired time-shifted position.

Figure 2A:
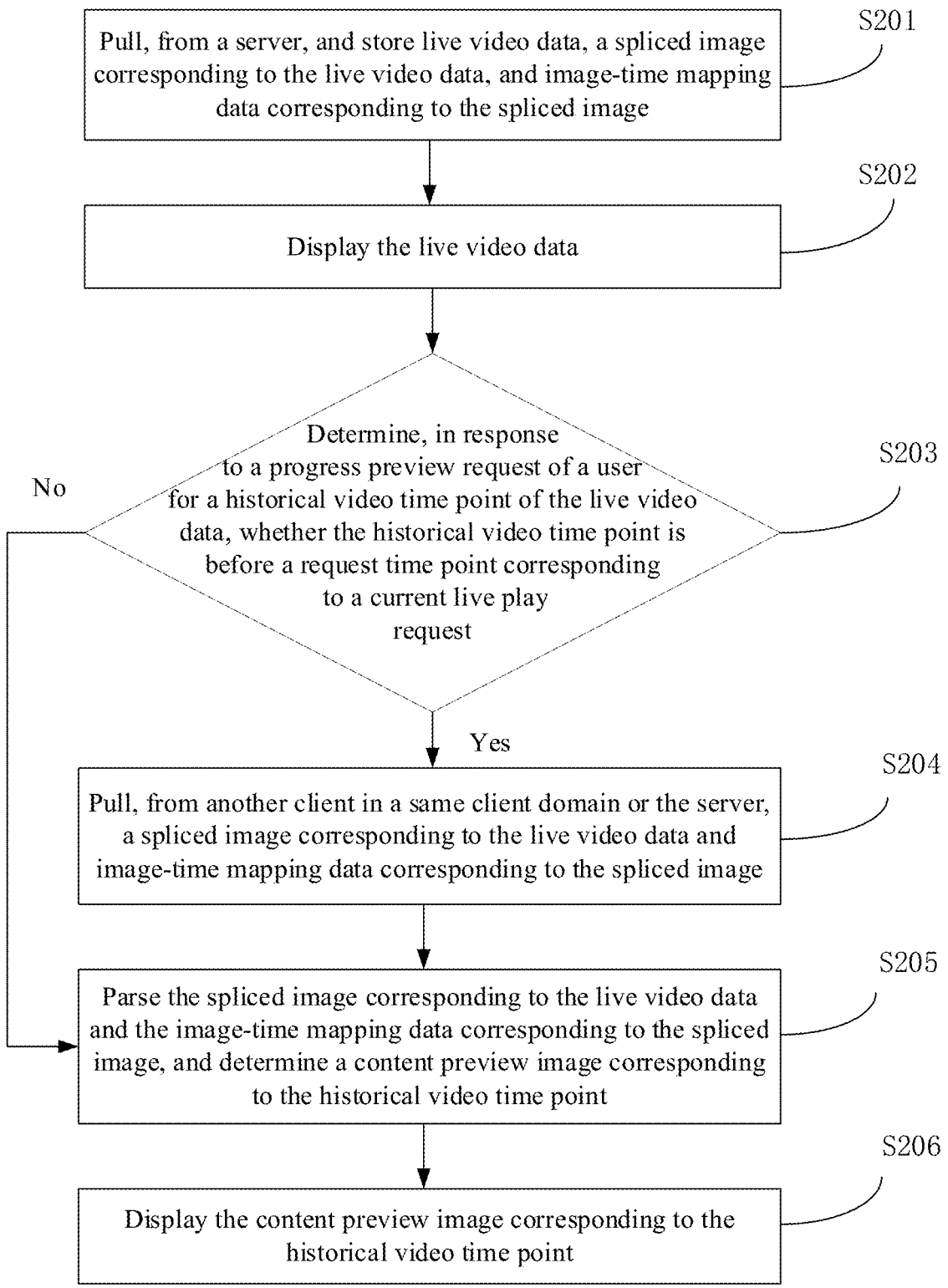
FIG. 2a is a schematic flowchart of a progress content preview processing method according to another embodiment of the present application.

FIG. 2a is a schematic flowchart of a progress content preview processing method according to another embodiment of the present application. The method is applicable to a client. As shown in FIG. 2a, the method includes the following steps.

In step S201: live video data, a spliced image corresponding to the live video data, and image-time mapping data corresponding to the spliced image are pulled from a server and stored.

In this step, when a user watches a live broadcast by using the client, the client may choose to pull the live video data from the server and store same in a local storage device, and the server sends the spliced image corresponding to the live video data and the image-time mapping data corresponding to the spliced image to the client during the process of the client pulling the live video data.

To reduce the amount of data transmission and alleviate the pressure of the server, in an optional implementation, step S201 further includes: sending a current live play request for a live broadcast room to the server in response to an operation of the user entering the live broadcast room, so that the server determines, in response to the current live play request, a request time point corresponding to the current live play request; and receiving and storing live video data of the live broadcast room that is obtained after the request time point and sent by the server, a spliced image corresponding to the live video data that is generated after the request time point, and image-time mapping data corresponding to the spliced image.

In step S202: the live video data is displayed.

Specifically, the user may enter the live broadcast room by using a device such as a player of the client. The client sends the current live play request for the live broadcast room to the server in response to the operation of the user entering the live broadcast room, receives and stores the live video data of the live broadcast room that is obtained after the request time point and sent by the server, the spliced image corresponding to the live video data that is generated after the request time point, and the image-time mapping data corresponding to the spliced image, and displays the live video data to the user in a display page of the live broadcast room based on the received live video data by using a device such as the player.

In step S203: in response to a progress preview request of a user for a historical video time point of the live video data, it is determined whether the historical video time point is before the request time point corresponding to the current live play request; and if yes, step S204 is performed; and if no, step S205 is performed.

Specifically, if the historical video time point is after the request time point corresponding to the current live play request, it indicates that the user wants to watch historical live video data that has been loaded after the user enters the live broadcast room. The spliced image pulled by the client from the server already includes a content view image corresponding to the historical video time point. Therefore, the content view image does not need to be re-pulled and can be directly parsed out from the spliced image and the image-time mapping data corresponding to the spliced image that have been locally stored. If the request time point is after the historical video time point, it indicates that the user wants to watch historical live content that has been live broadcast before the user enters the live broadcast room but is not watched by the user. The spliced image pulled by the client includes no content view image corresponding to the historical video time point. Therefore, a spliced image corresponding to the live video data and image-time mapping data corresponding to the spliced image need to be pulled again.

In step S204: a spliced image corresponding to the live video data and image-time mapping data corresponding to the spliced image is pulled from another client in a same client domain or the server.

In an optional implementation, step S204 further includes: requesting, in a point-to-point communication manner and from the another client in the same client domain, a spliced image including the content view image corresponding to the historical video time point and image-time mapping data corresponding to the spliced image; and if the another client in the same client domain includes no spliced image including the content view image corresponding to the historical video time point or image-time mapping data corresponding to the spliced image, requesting, from the server, a spliced image including the content view image corresponding to the historical video time point and image-time mapping data corresponding to the spliced image.

In this step, the point-to-point communication manner may include a communication manner such as P2P. If the historical video time point is before the request time point corresponding to the current live play request, it indicates that the user wants to watch historical live content that has been live broadcast before the user enters the live broadcast room but is not watched by the user. The spliced image pulled by the client includes no content view image corresponding to the historical video time point. Therefore, a spliced image corresponding to the live video data and image-time mapping data corresponding to the spliced image need to be pulled again. In this case, the spliced image corresponding to the live video data and the image-time mapping data corresponding to the spliced image may be pulled from the another client in the same client domain in the P2P communication manner, or may be pulled again from the server.

The same client domain is an organizational unit including clients served by a same edge serving node. The another client located in the same client domain as the client may also be referred to as a neighboring client of the client, and the spliced image corresponding to the live video data and the image-time mapping data corresponding to the spliced image can be more quickly obtained by querying the another client that has been served by the same edge serving node. If the another client in the same client domain includes no spliced image including the content view image corresponding to the historical video time point or image-time mapping data corresponding to the spliced image, a spliced image including the content view image corresponding to the historical video time point and image-time mapping data corresponding to the spliced image may be requested from the server. In this manner, the rate and accuracy of pulling the spliced image and the image-time mapping data corresponding to the spliced image can be improved. The spliced image including the content view image corresponding to the historical video time point may be specifically a spliced image obtained by continuously splicing content view images generated from real-time live video data from a live broadcast start time point.

In step S205: the spliced image corresponding to the live video data and the image-time mapping data corresponding to the spliced image are parsed, and a content view image corresponding to the historical video time point is determined.

The image-time mapping data corresponding to the spliced image is searched for an image identifier that has a mapping relationship with the historical video time point; and a content view image corresponding to the image identifier is extracted from the spliced image corresponding to the live video data, and the content view image is determined as the content view image corresponding to the historical video time point.

After pulling the spliced image corresponding to the live video data and the image-time mapping data corresponding to the spliced image, the client further needs to parse the spliced image and the image-time mapping data corresponding to the spliced image, to obtain the content view image corresponding to the historical video time point. Specifically, the content view images are represented by using image identifiers of the content view images, and mapping relationships between the image identifiers of the content view images and video time points are recorded in the image-time mapping data. A image identifier of the content view image corresponding to the historical video time point is searched for with reference to the video time points recorded in the image-time mapping data corresponding to the spliced image, and then the spliced image is searched for the content view image corresponding to the image identifier.

In step S206: the content view image corresponding to the historical video time point is displayed.

Figure 2B:
FIG. 2b is a schematic diagram of page display.

The client may display, at a preset position of a progress display element such as a progress bar in a display page of the live broadcast room by using the player, the content view image corresponding to the historical video time point. The preset position may be a position above the progress display element, etc. FIG. 2b is a schematic diagram of page display. As shown in FIG. 2b, the content view image corresponding to the historical video time point may be displayed, in a small window manner, above the progress bar in the display page of the live broadcast room.

According to the progress content preview processing method provided in this embodiment of the present application, the client parses, in response to the progress preview request of the user for the historical video time point of the live video data, the spliced image corresponding to the live video data and the image-time mapping data corresponding to the spliced image that are provided by the server, and determines and displays the content view image corresponding to the historical video time point, to provide the user with a live time-shifted content view image. Therefore, the user can watch content view images at different historical video time points of the live video data, and quickly know picture content during live time shifting, so as to quickly locate an actually desired time-shifted position.

Figure 3:
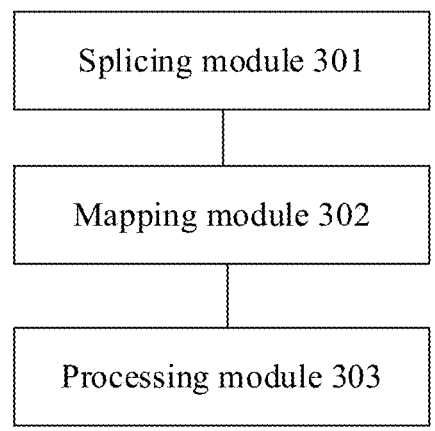
FIG. 3 is a structural block diagram of a progress content preview processing apparatus according to an embodiment of the present application.

FIG. 3 is a structural block diagram of a progress content preview processing apparatus according to an embodiment of the present application. The apparatus is applicable to a server. As shown in FIG. 3, the apparatus includes: a splicing module 301, a mapping module 302, and a processing module 303.

The splicing module 301 is configured to obtain live video data, generate content view images based on the live video data, and splice the content view images to obtain a spliced image corresponding to the live video data.

In an optional implementation, the splicing module 301 is further configured to: perform key frame extraction on the live video data to obtain key frames; and generate the content view images by using the key frames.

In an optional implementation, the live video data includes: an intra picture, a predictive-frame, and a bi-directional interpolated prediction frame; and the splicing module 301 is further configured to: detect whether a current frame in the live video data is an intra picture; and if the current frame is the intra picture, extract the current frame from the live video data, and determine the current frame as the key frame.

In an optional implementation, the splicing module 301 is further configured to: for each of the key frames, perform resolution compression processing on a frame image of the key frame to compress a resolution of the frame image to a preset resolution to obtain a content view image corresponding to the key frame.

In an optional implementation, the splicing module 301 is further configured to: write the image-time mapping data corresponding to the spliced image and the preset resolution into a description file.

In an optional implementation, the splicing module 301 is further configured to: add the content view images to a preset image container according to a generation sequence of the content view images, and set position information of the content view images in the preset image container, to obtain the spliced image corresponding to the live video data.

The mapping module 302 is configured to record mapping relationships between the content view images and video time points to form image-time mapping data corresponding to the spliced image.

In an optional implementation, the mapping module 302 is further configured to: obtain video time points of the key frames in the live video data, and record mapping relationships between image identifiers of content view images corresponding to the key frames and the video time points of the key frames in the live video data to form the image-time mapping data corresponding to the spliced image.

The processing module 303 is configured to send, to a client, the spliced image corresponding to the live video data and the image-time mapping data corresponding to the spliced image during a process of the client pulling the live video data, so that the client parses, in response to a progress preview request of a user for a historical video time point of the live video data, the spliced image corresponding to the live video data and the image-time mapping data corresponding to the spliced image, and determines and displays a content view image corresponding to the historical video time point.

In an optional implementation, the processing module 303 is further configured to: determine, in response to a current live play request for a live broadcast room that is sent by the client, a request time point corresponding to the current live play request; and send, in real time and to the client, live video data of the live broadcast room that is obtained after the request time point, a spliced image corresponding to the live video data that is generated after the request time point, and image-time mapping data corresponding to the spliced image.

For description of the above modules, reference is made to the corresponding description in the method embodiment. Details are not described herein again.

According to the progress content preview processing apparatus provided in this embodiment of the present application, during an HLS-based slice production process, the content view images can be produced in real time, and the plurality of content view images can be spliced together in the form of the spliced image, namely, a sprite. The spliced image corresponding to the live video data and the image-time mapping data corresponding to the spliced image are provided to the client together, so that the client parses, in response to the progress preview request of the user for the historical video time point of the live video data, the spliced image corresponding to the live video data and the image-time mapping data corresponding to the spliced image, and determines and displays the content view image corresponding to the historical video time point, to provide the user with a live time-shifted content view image. Therefore, the user can watch content view images at different historical video time points of the live video data, and quickly know picture content during live time shifting, so as to quickly locate an actually desired time-shifted position.

Figure 4:
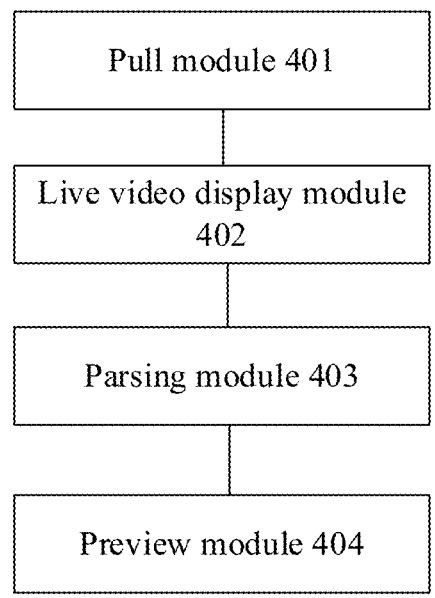
FIG. 4 is a structural block diagram of a progress content preview processing apparatus according to another embodiment of the present application.

FIG. 4 is a structural block diagram of a progress content preview processing apparatus according to another embodiment of the present application. The apparatus is applicable to a client. As shown in FIG. 4, the apparatus includes: a pull module 401, a live video display module 402, a parsing module 403, and a preview module 404.

The pull module 401 is configured to pull, from a server, and store live video data, a spliced image corresponding to the live video data, and image-time mapping data corresponding to the spliced image.

In an optional implementation, the pull module 401 is further configured to: send a current live play request for a live broadcast room to the server in response to an operation of the user entering the live broadcast room, so that the server determines, in response to the current live play request, a request time point corresponding to the current live play request; and receive and store live video data of the live broadcast room that is obtained after the request time point and sent by the server, a spliced image corresponding to the live video data that is generated after the request time point, and image-time mapping data corresponding to the spliced image.

The live video display module 402 is configured to display the live video data.

The parsing module 403 is configured to parse, in response to a progress preview request of a user for a historical video time point of the live video data, the spliced image corresponding to the live video data and the image-time mapping data corresponding to the spliced image, and determine a content view image corresponding to the historical video time point.

In an optional implementation, the parsing module 403 is further configured to: search the image-time mapping data corresponding to the spliced image for an image identifier that has a mapping relationship with the historical video time point; and extract a content view image corresponding to the image identifier from the spliced image corresponding to the live video data, and determine the content view image as the content view image corresponding to the historical video time point.

In an optional implementation, the parsing module 403 is further configured to: determine whether the historical video time point is before the request time point corresponding to the current live play request; and if the historical video time point is before the request time point corresponding to the current live play request, pull, from another client in a same client domain or the server, a spliced image corresponding to the live video data and image-time mapping data corresponding to the spliced image.

In an optional implementation, the parsing module 403 is further configured to: request, in a point-to-point communication manner and from the another client in the same client domain, a spliced image including the content view image corresponding to the historical video time point and image-time mapping data corresponding to the spliced image; and if the another client in the same client domain includes no spliced image including the content view image corresponding to the historical video time point or image-time mapping data corresponding to the spliced image, request, from the server, a spliced image including the content view image corresponding to the historical video time point and image-time mapping data corresponding to the spliced image.

In an optional implementation, the same client domain is an organizational unit including clients served by a same edge serving node.

The preview module 404 is configured to display the content view image corresponding to the historical video time point.

In an optional implementation, the preview module 404 is further configured to: display, at a preset position of a progress display element in a display page of the live broadcast room, the content view image corresponding to the historical video time point.

For description of the above modules, reference is made to the corresponding description in the method embodiment. Details are not described herein again.

According to the progress content preview processing apparatus provided in this embodiment of the present application, the client parses, in response to the progress preview request of the user for the historical video time point of the live video data, the spliced image corresponding to the live video data and the image-time mapping data corresponding to the spliced image that are provided by the server, and determines and displays the content view image corresponding to the historical video time point, to provide the user with a live time-shifted content view image. Therefore, the user can watch content view images at different historical video time points of the live video data, and quickly know picture content during live time shifting, so as to quickly locate an actually desired time-shifted position.

An embodiment of the present application further provides a progress content preview processing system. The progress content preview processing system includes the progress content preview processing apparatus applied to the server and the progress content preview processing apparatus applied to the client that are shown in the above embodiments.

An embodiment of the present application further provides a non-volatile computer storage medium storing at least one executable instruction, where the executable instruction may be used to execute a progress content preview processing method in any one of the above method embodiments.

Figure 5:
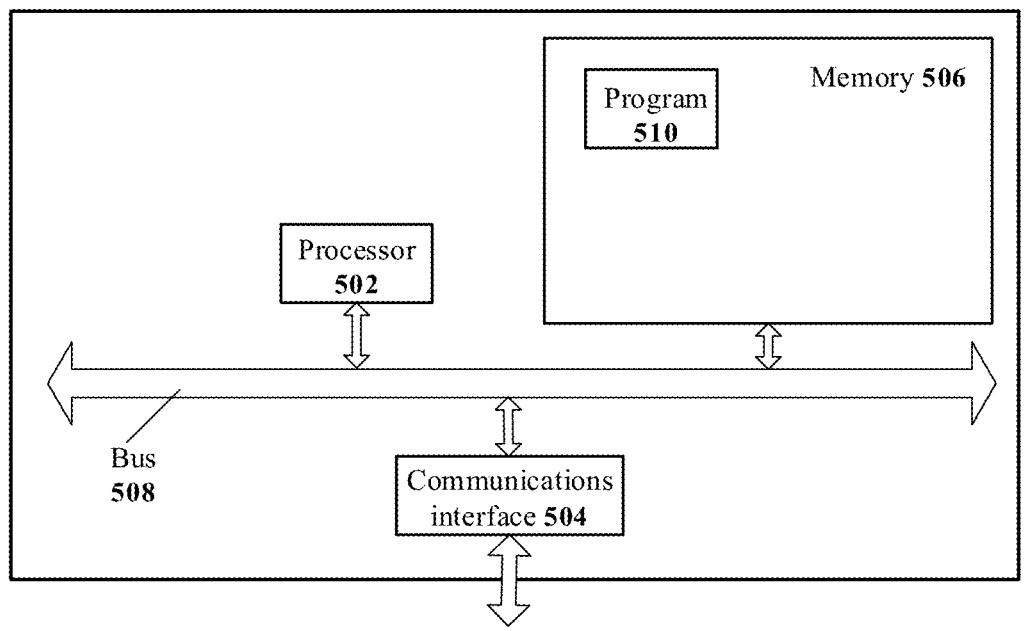
FIG. 5 is a schematic structural diagram of a computing device according to an embodiment of the present application.

FIG. 5 is a schematic structural diagram of a computing device according to an embodiment of the present application. The specific implementation of the computing device is not limited in the specific embodiments of the embodiments of the present application. As shown in FIG. 5, the computing device may include: a processor 502, a communications interface 504, a memory 506, and a communications bus 508.

The processor 502, the communications interface 504, and the memory 506 complete communication with each other via the communications bus 508.

The communications interface 504 is configured to communicate with a network element of another device, such as a client or another server.

The processor 502 is configured to execute a program 510, and may specifically perform related steps in the embodiment of the above progress content preview processing method.

Specifically, the program 510 may include program code, and the program code includes computer operation instructions.

The processor 502 may be a central processing unit (CPU), an application-specific integrated circuit (ASIC), or one or more integrated circuits configured to implement the embodiments of the present application. One or more processors included in the computing device may be processors of a same type, for example, one or more CPUs, or may be processors of different types, for example, one or more CPUs and one or more ASICS.

The memory 506 is configured to store the program 510. The memory 506 may include a high-speed RAM, or may further include a non-volatile memory, for example, at least one magnetic disk memory.

The program 510 may be specifically used to cause the processor 502 to perform a progress content preview processing method in any one of the above method embodiments. For specific implementation of steps in the program 510, reference may be made to corresponding description of respective steps and units in the above embodiment of a progress content preview processing method. Details are not described herein again. It may be clearly understood by a person skilled in the art that, for ease and clarity of description, reference may be made to corresponding process description in the above method embodiment for detailed working processes of the devices and modules described above, and details are not described herein again.

The algorithm and display provided here are not inherently related to any particular computer, virtual system or other device. Various general systems can also be used together with the demonstration teaching based hereon. According to the description above, constructing a structure required for this kind of systems is obvious. In addition, the embodiments of the present application are not specific to any specific programming language. It should be understood that the content of the embodiments of the present application described herein may be implemented by using various programming languages, and the above description of the specific language is intended to disclose the best implementations of the embodiments of the present application.

The description as provided herein describes a lot of specific details. However, it is possible to understand that the embodiments of the present invention may be practiced without these specific details. In some instances, well-known methods, structures, and techniques are not shown in detail so as not to obscure the understanding of this description.

Similarly, it should be understood that in order to simplify the present disclosure and help understand one or more of the aspects of the present invention, in the above description of the exemplary embodiments of the embodiments of the present application, features of the embodiments of the present application are sometimes grouped together into an individual embodiment, drawing, or description thereof. However, the method of the present disclosure should not be construed as reflecting the following intention: the claimed embodiments of the present application require more features than those explicitly stated in each claim. To be more precise, as reflected in the following claims, the aspects of the invention lie in less than all the features of the individual embodiment disclosed above. Therefore, the claims in accordance with the specific implementations are thereby explicitly incorporated into the specific implementations, where each claim itself is used as a separate embodiment of the embodiments of the present application.

A person skilled in the art may understand that modules in a device in an embodiment may be adaptively changed and disposed in one or more devices different from the device in the embodiment. Modules, units, or components in an embodiment may be combined into one module, unit, or component, and may also be divided into a plurality of submodules, subunits, or subcomponents. Except that such features and/or at least some of the processes or units are mutually exclusive, any combination may be used to combine all the features disclosed in this description (including the accompanying claims, abstract, and drawings) and all processes or units of any method or device disclosed in such way. Unless explicitly stated otherwise, each feature disclosed in this description (including the accompanying claims, abstract, and drawings) may be replaced with an alternative feature providing a same, equivalent, or similar purpose.

In addition, a person skilled in the art can understand that although some embodiments herein include some features included in other embodiments rather than other features, a combination of features of different embodiments means falling within the scope of the embodiments of the present application and forming different embodiments. For example, in the following claims, any one of the claimed embodiments may be used in any combination.

The component embodiments of the embodiments of the present application may be implemented in hardware, or may be implemented in software modules running on one or more processors, or in a combination thereof. A person skilled in the art should understand that in practice, a microprocessor or a digital signal processor (DSP) may be used to implement some or all of functions of some or all of the components according to the embodiments of the present application. The embodiments of the present application may be further implemented as device or apparatus programs (for example, a computer program and a computer program product) for performing some or all of the methods described herein. Such a program for implementing the embodiments of the present application may be stored in a computer-readable medium, or may be in the form of one or more signals. Such a signal may be downloaded from an Internet site, or provided on a carrier signal, or provided in any other form.

It should be noted that the above embodiments are intended to describe, rather than to limit, the embodiments of the present application, and a person skilled in the art may design alternative embodiments without departing from the scope of the appended claims. In the claims, any reference numerals placed between parentheses shall not be construed as limitations on the claims. The word "include" does not exclude the presence of elements or steps not listed in the claims. The word "a" or "an" preceding an element does not exclude the presence of a plurality of such elements. The embodiments of the present application may be implemented by using hardware including several different elements and by using an appropriately programmed computer. In the unit claims enumerating several apparatuses, several of these apparatuses may be specifically embodied by a same item of hardware. The use of the words such as first, second, and third does not indicate any order. These words can be interpreted as names.

What is claimed is:

1. A method of processing data, comprising:
obtaining live video data;
generating content view images based on the live video data;
generating a spliced image corresponding to the live video data based on splicing the content view images;
generating image-time mapping data corresponding to the spliced image by recording mapping relationships between the content view images and video time points, wherein the spliced image and the image-time mapping data enable to display a content view image corresponding to a historical video time point at a location close to a progress element on a page of playing the live video data; and
sending, to the client device, the live video data, the spliced image corresponding to the live video data, and the image-time mapping data corresponding to the spliced image during a process of pulling the live video data by the client device, wherein the client device parses the spliced image corresponding to the live video data and the image-time mapping data corresponding to the spliced image, determines, and displays the content view image corresponding to the historical video time point in response to a progress view request for the historical video time point,
wherein the client device further determines whether the historical video time point is prior to a request time point corresponding to a current live play request for a live broadcast room, wherein the request time point is determined by a server in response to receiving the current live play request from the client device, and
in response to determining that the historical video time point is prior to the request time point corresponding to the current live play request, pulls, from another client device in a same client domain or the server, a spliced image including the content view image corresponding to the historical video time point and respective image-time mapping data.

2. The method according to claim 1, wherein the generating content view images based on the live video data further comprises:
   extracting key frames from the live video data; and
   generating the content view images based on the key frames.

3. The method according to claim 2, wherein the extracting key frames from the live video data further comprises:
   detecting whether a current frame in the live video data is an intra picture; and
   extracting the current frame from the live video data and identifying the current frame as one of the key frames in response to detecting that the current frame is the intra picture.

4. The method according to claim 2, wherein the generating the content view images based on the key frames further comprises:
   performing resolution compression on each frame image of the key frames; and
   generating the content view images by compressing a resolution of each frame image of the key frames to a predetermined resolution.

5. The method according to claim 4, further comprises:
   writing the image-time mapping data corresponding to the spliced image and the predetermined resolution into a description file.

6. The method according to claim 1, wherein the generating a spliced image corresponding to the live video data further comprises:
   sequentially adding the content view images to a preset image container according to an order in which the content view images are generated; and
   setting position information of the content view images in the preset image container.

7. The method according to claim 1, wherein the generating image-time mapping data corresponding to the spliced image by recording mapping relationships between the content view images and video time points further comprises:
   obtaining video time points of the key frames in the live video data; and
   generating the image-time mapping data corresponding the spliced image by recording mapping relationships between image identifiers of the content view images corresponding to the key frames and the video time points of the key frames in the live video data.

8. The method according to claim 1, wherein the sending, to a client device, the live video data, the spliced image corresponding to the live video data, and the image-time mapping data corresponding to the spliced image during a process of pulling the live video data further comprises:
   determining, in response to receiving a current live play request for a live broadcast room from the client device, a request time point corresponding to the current live play request; and
   sending, in real time and to the client device, live video data of the live broadcast room that is obtained from the request time point, a spliced image corresponding to the live video data that is generated after the request time point, and image-time mapping data corresponding to the spliced image.

9. A method, comprising:
   pulling from a server and storing live video data, a spliced image corresponding to the live video data, and image-time mapping data corresponding to the spliced image;
   playing the live video data;
   parsing the spliced image corresponding to the live video data and the image-time mapping data corresponding to the spliced image in response to receiving a progress view request for a historical video time point of the live video data;
   determining a content view image corresponding to the historical video time point;
   displaying the content view image corresponding to the historical video time point at a location close to a progress element while playing the live video data;
   wherein the method further comprises:
   sending a current live play request for a live broadcast room to the server in response to an operation of entering a live broadcast room, wherein the server determines a request time point corresponding to the current live play request;
   determining whether the historical video time point is prior to the request time point corresponding to the current live play request; and
   in response to determining that the historical video time point is prior to the request time point corresponding to the current live play request, pulling, from another client device in a same client domain or the server, another spliced image corresponding to the live video data and image-time mapping data corresponding to the other spliced image.

10. The method according to claim 9, wherein the pulling from a server and storing live video data, a spliced image corresponding to the live video data, and image-time mapping data corresponding to the spliced image further comprises:
    receiving and storing the live video data of the live broadcast room that is obtained from the request time point and sent by the server, the spliced image corresponding to the live video data that is generated after the request time point, and the image-time mapping data corresponding to the spliced image.

11. The method according to claim 9, further comprising:
    searching the image-time mapping data corresponding to the spliced image for an image identifier that has a mapping relationship with the historical video time point;
    extracting a content view image corresponding to the image identifier from the spliced image corresponding to the live video data; and
    identifying the content view image corresponding to the image identifier as the content view image corresponding to the historical video time point.

12. The method according to claim 9, wherein the pulling, from another client device in a same client domain or the server, another spliced image corresponding to the live video data and image-time mapping data corresponding to the other spliced image further comprises:
    requesting, in a point-to-point communication manner and from the other client device in the same client domain, the other spliced image including the content view image corresponding to the historical video time point and the image-time mapping data corresponding to the other spliced image; and
    in response to determining that the other client device in the same client domain does not comprise spliced image including the content view image corresponding to the historical video time point or does not comprise image-time mapping data, requesting the other spliced image including the content view image corresponding to the historical video time point and the image-time mapping data corresponding to the other spliced image from the server.

13. The method according to claim 9, wherein the same client domain is an organizational unit comprising client devices served by a same edge serving node.

14. The method according to claim 9, wherein the displaying the content view image corresponding to the historical video time point at a location close to a progress element while playing the live video data further comprises:
displaying the content view image corresponding to the historical video time point above and near a progress bar displayed on a page of playing the live video data.

15. A computing system, comprising at least one processor and at least one a memory, wherein the at least one memory comprises computer-readable instructions that upon execution by the at least one processor cause the at least one processor to perform operations, the operations comprising:
obtaining live video data;
generating content view images based on the live video data;
generating a spliced image corresponding to the live video data based on splicing the content view images;
generating image-time mapping data corresponding to the spliced image by recording mapping relationships between the content view images and video time points, wherein the spliced image and the image-time mapping data enable to display a content view image corresponding to a historical video time point at a location close to a progress element on a page of playing the live video data; and
sending, to the client device, the live video data, the spliced image corresponding to the live video data, and the image-time mapping data corresponding to the spliced image during a process of pulling the live video data by the client device, wherein the client device parses the spliced image corresponding to the live video data and the image-time mapping data corresponding to the spliced image, determines, and displays the content view image corresponding to the historical video time point in response to a progress view request for the historical video time point,
wherein the client device further determines whether the historical video time point is prior to a request time point corresponding to a current live play request for a live broadcast room, wherein the request time point is determined by a server in response to receiving the current live play request from the client device, and
in response to determining that the historical video time point is prior to the request time point corresponding to the current live play request, pulls, from another client device in a same client domain or the server, a spliced image including the content view image corresponding to the historical video time point and respective image-time mapping data.

16. The computing system according to claim 15, wherein the generating a spliced image corresponding to the live video data further comprises:
sequentially adding the content view images to a preset image container according to an order in which the content view images are generated; and
setting position information of the content view images in the preset image container.

17. A computing device, comprising a processor, a memory, wherein the memory comprises computer-readable instructions that upon execution by the processor cause the processor to perform operations comprising:
pulling from a server and storing live video data, a spliced image corresponding to the live video data, and image-time mapping data corresponding to the spliced image;
playing the live video data;
parsing the spliced image corresponding to the live video data and the image-time mapping data corresponding to the spliced image in response to receiving a progress view request for a historical video time point of the live video data;
determining a content view image corresponding to the historical video time point; and
displaying the content view image corresponding to the historical video time point at a location close to a progress element while playing the live video data;
wherein the operations further comprise:
determining whether the historical video time point is prior to a request time point corresponding to a current live play request for a live broadcast room, wherein the request time point is determined by the server in response to receiving the current live play request from the computing device; and
in response to determining that the historical video time point is prior to the request time point corresponding to the current live play request, pulling, from another client device in a same client domain or the server, a spliced image including the content view image corresponding to the historical video time point and respective image-time mapping data.

18. The computing device according to claim 17, the operations further comprising:
searching the image-time mapping data corresponding to the spliced image for an image identifier that has a mapping relationship with the historical video time point;
extracting a content view image corresponding to the image identifier from the spliced image corresponding to the live video data; and
identifying the content view image corresponding to the image identifier as the content view image corresponding to the historical video time point.

19. The computing device according to claim 17, wherein the same client domain is an organizational unit comprising client devices served by a same edge serving node.

20. The computing device according to claim 17, wherein the displaying the content view image corresponding to the historical video time point at a location close to a progress element while playing the live video data further comprises:
displaying the content view image corresponding to the historical video time point above and near a progress bar displayed on a page of playing the live video data.

* * * * *